United States Patent
Morel

(10) Patent No.: US 9,647,511 B2
(45) Date of Patent: May 9, 2017

(54) HOLDING PIECES FOR COILS OF A PRIMARY PART OF A IRONLESS LINEAR MOTOR

(71) Applicant: ETEL S.A., Motiers (CH)

(72) Inventor: Jean-Pierre Morel, Les Fourgs (FR)

(73) Assignee: ETEL S.A., Motiers (CH)

( * ) Notice: Subject to any disclaimer, the term of this patent is extended or adjusted under 35 U.S.C. 154(b) by 611 days.

(21) Appl. No.: 14/080,101

(22) Filed: Nov. 14, 2013

(65) Prior Publication Data

US 2014/0132088 A1 May 15, 2014

(30) Foreign Application Priority Data

Nov. 15, 2012 (EP) .................................... 12192752

(51) Int. Cl.
*H02K 9/22* (2006.01)
*H02K 41/02* (2006.01)
*H02K 41/03* (2006.01)
*H02K 3/47* (2006.01)

(52) U.S. Cl.
CPC ................. *H02K 9/22* (2013.01); *H02K 3/47* (2013.01); *H02K 41/02* (2013.01); *H02K 41/03* (2013.01)

(58) Field of Classification Search
CPC .. H02K 1/18; H02K 3/47; H02K 9/22; H02K 41/02; H02K 41/03
USPC ......... 310/12.02, 12.21, 12.22, 12.27, 12.29, 310/12.31, 12.33, 16, 216.098
See application file for complete search history.

(56) References Cited

U.S. PATENT DOCUMENTS

| | | | | |
|---|---|---|---|---|
| 3,487,241 A | * | 12/1969 | Carter | ................... H02K 35/04 310/13 |
| 5,565,718 A | * | 10/1996 | Takei | ................... H02K 41/031 310/12.02 |
| 5,723,917 A | | 3/1998 | Chitayat | |
| 6,114,781 A | * | 9/2000 | Hazelton | ............. G03F 7/70758 310/12.06 |
| 6,313,550 B1 | * | 11/2001 | Binnard | ............... H02K 41/031 310/12.21 |
| 6,639,333 B1 | | 10/2003 | Kamata et al. | |
| 6,789,305 B2 | * | 9/2004 | Seki | ......................... H02K 3/24 29/596 |
| 7,205,687 B2 | * | 4/2007 | Wavre | ....................... H02K 1/20 310/12.29 |
| 7,329,972 B2 | * | 2/2008 | Ito | ........................ G03F 7/70758 310/12.01 |
| 7,345,384 B2 | * | 3/2008 | Yoshida | .................. H02K 41/03 310/12.06 |
| 7,622,832 B2 | | 11/2009 | Moriyama | |
| 7,663,270 B2 | * | 2/2010 | Sadakane | ............. H02K 41/031 310/12.23 |

(Continued)

*Primary Examiner* — Terrance Kenerly
*Assistant Examiner* — Rashad Johnson
(74) *Attorney, Agent, or Firm* — Andrews Kurth Kenyon LLP

(57) ABSTRACT

A primary part of an ironless linear motor includes a cooling plate on which flat coils are disposed, each having a central opening. The coils are pressed onto the cooling plate by holding pieces which taper toward the cooling plate and engage in the openings in the coils. In this manner, an especially good contact is produced between the flat coils of the primary part and the cooling plate prior to encapsulating the primary part with a synthetic resin, the cooling effect of the preferably actively cooled cooling plate thereby being increased markedly.

12 Claims, 2 Drawing Sheets

(56) References Cited

U.S. PATENT DOCUMENTS

| | | | |
|---|---|---|---|
| 7,768,156 B2* | 8/2010 | Ito | G03F 7/70758 |
| | | | 310/12.06 |
| 7,936,096 B2* | 5/2011 | Shikayama | H02K 41/0356 |
| | | | 310/12.29 |
| 2006/0049700 A1 | 3/2006 | Moriyama | |

* cited by examiner

HOLDING PIECES FOR COILS OF A PRIMARY PART OF A IRONLESS LINEAR MOTOR

CROSS-REFERENCE TO RELATED APPLICATIONS

The present application claims priority to application Ser. No. 12/192,752.9, filed in the European Patent Office on Nov. 15, 2012, which is expressly incorporated herein in its entirety by reference thereto.

FIELD OF THE INVENTION

The present invention relates to a primary part of an ironless linear motor and a linear motor having such a primary part.

BACKGROUND INFORMATION

Such linear motors have advantages in applications which require highly precise positioning, because by dispensing with an iron core in the primary part, disturbing cogging torques are avoided. However, in order to be able to bring about high forces, even without an iron core, the greatest possible coil currents are necessary, which may only be achieved with sufficient cooling of the coils.

U.S. Pat. No. 6,639,333 describes an ironless linear motor which drives the table of an exposure apparatus for manufacturing semiconductors. For precise positioning, it is important that the individual coils of the linear motor remain exactly at their intended position in the primary part, and do not shift relative to each other. This is ensured by a comb-like structure, in whose recesses flat coils are inserted. In order to cool the coils, they are jacketed by a housing in which a cooling medium is in direct contact with the coils.

The objectives of cooling and securing the coils are achieved in similar manner in U.S. Pat. No. 6,313,550, as well, in which structures for inserting the flat coils and a direct circumflow with a cooling medium are likewise described for an ironless planar motor.

Because of the great forces which act on the individual coils in the linear motor, and because of the possible problems with the insulation of the coils, given the direct circumflow with a cooling medium, it is advantageous if the coils are encapsulated with an electrically insulating, good heat-conducting synthetic resin that lends the coils additional stability, both against deformation and against shifting of the entire coil.

Thus, a linear motor is described in U.S. Pat. No. 5,723,917, in which the flat coils are encapsulated in a synthetic-resin block and disposed on a cooling plate that is used for the magnetic flux concentration, on one hand, and on the other hand, for cooling, by passing channels through it for a cooling medium. The synthetic-resin block is joined to the cooling plate with form-locking by noses on the cooling plate that project from the plate. However, the waste heat from the coils must always be dissipated to the cooling plate via an electrically insulating area, e.g., via the synthetic resin and/or further insulating layers. In addition, it is difficult to set the position of the coils exactly prior to the encapsulation with synthetic resin.

SUMMARY

Example embodiments of the present invention provide a primary part of an ironless linear motor which is easy to produce, whose coils are retained reliably in predefined positions, and in which the coils are able to be well-cooled.

A primary part of an ironless linear motor includes a cooling plate on which flat coils are disposed, each having a central opening. The coils are pressed onto the cooling plate by holding pieces which taper toward the cooling plate and engage in the openings in the coils.

In this manner, an especially good contact is produced between the flat coils of the primary part and the cooling plate prior to encapsulating the primary part with a synthetic resin, the cooling effect of the preferably actively cooled cooling plate thereby being increased markedly compared to conventional arrangements.

Further features and aspects of example embodiments of the present invention are described in more detail below with reference to the appended Figures.

DETAILED DESCRIPTION

Figure 1:
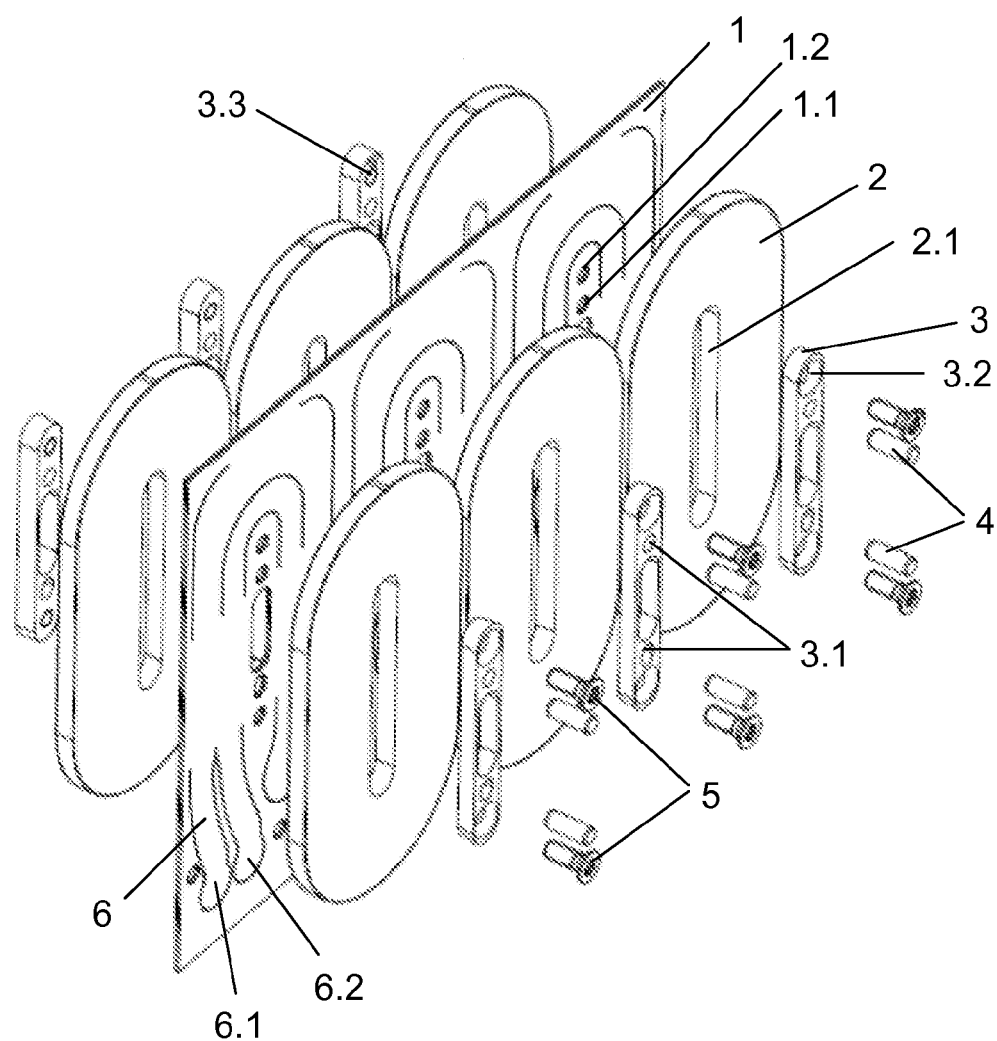
FIG. 1 is an exploded view of a primary part.

FIG. 1 is an exploded view of an ironless primary part according to an exemplary embodiment of the present invention. FIG. 1 illustrates a cooling plate 1 and coolant channels 6 having an inlet 6.1 and an outlet 6.2 for each flat coil 2 disposed on cooling plate 1.

Cooling plate 1 is produced from titanium, since this metal exhibits good thermal conductivity, accompanied at the same time by comparatively high specific resistance. The first is a necessary property for a cooling plate, the latter prevents eddy currents in the cooling plate from being too great.

Such cooling plates made of titanium may be produced using the processes of 3-D printing, even including the threads needed for the connections of the cooling medium. However, such cooling plates may also be produced using classic ablative processing methods, e.g., by welding together two plate halves, into which grooves are milled beforehand.

Each flat coil 2 is made of a copper wire which is wound about a central opening 2.1 in coil 2, so that although many wires lie flat side-by-side in one plane, only one or a few layers of such turns lie perpendicular to the coil plane or parallel to the coil axis. This special coil form leads, on one hand, to a flat construction of the primary part, and on the other hand, permits contact over a large surface with cooling plate 1, which likewise is flat.

To produce such coils 2, the copper wire, insulated with ceramics and coated with an adhesive, is wound onto a form which very precisely defines later opening 2.1. While the coil is still sitting on this form, it is hardened under pressure and heat. In the process, the form of opening 2.1 is retained, while the outer shape of coil 2 may indeed change. It is therefore advantageous to refer to the form of opening 2.1 during the later mounting of coil 2.

For the assembly, prefabricated coils 2 are placed on cooling plate 1 and secured there with holding pieces 3. These holding pieces 3 engage in openings 2.1 of coils 2 and fix their position. Centering pins 4, which are inserted through bores 1.1 in cooling plate 1 and bores 3.1 in holding pieces 3, ensure an exact alignment of holding pieces 3, and therefore also of coils 2. Two centering pins 4 are used for each holding piece 3, since their position on cooling plate 1 is thus determined exactly. One of the two bores 3.1 in holding piece 3 may be formed as an elongated hole.

Holding pieces 3 have a shape which tapers toward cooling plate 1 and corresponds to openings 2.1 in coils 2, so that on one hand, they may be inserted easily into openings 2.1 during assembly, and on the other hand, with their broader side facing away from cooling plate 1, they press coils 2 onto cooling plate 1. Therefore, coils 2 are neither able to shift out of place in the coil plane on cooling plate 1, nor are they able to slip from holding pieces 3 in the direction of the coil axis. Due to this special form of holding pieces 3, coils 2 are secured on cooling plate 1 with form locking in all directions.

In the exemplary embodiment illustrated, coils 2 are disposed opposite each other in pairs on both sides of cooling plate 1, their magnetic fields strengthening in each case. Holding pieces 3 of two facing coils 2 are joined to each other by screws 5, so that upon tightening screws 5, the two coils 2 and cooling plate 1 are clamped between holding pieces 3. To that end, holding pieces 3 on the one side of cooling plate 1 have a bore 3.2 having a chamfer for the screw head, while the respective opposite holding piece has a bore 3.3 having a thread. For the assembly, a screw 5 is thus guided through bores 3.2 and a corresponding bore 1.2 in cooling plate 1, and screwed into the thread of bore 3.3 of opposite holding piece 3. Holding pieces 3 and coils 2 are then (because of the tapering form of holding pieces 3) pressed against cooling plate 1 as screws 5 are tightened. Good thermal contact is thus produced between coils 2 and cooling plate 1.

To avoid the necessity of keeping two different holding pieces 3 on hand, it is possible to provide one of the two bores for screws 5 with the chamfer for the screw head, and the other with the thread. The two holding pieces 3 are then screwed together by guiding one screw 5 each from both sides of the cooling plate through bores 3.2, 1.2, and 3.3.

Figure 2:
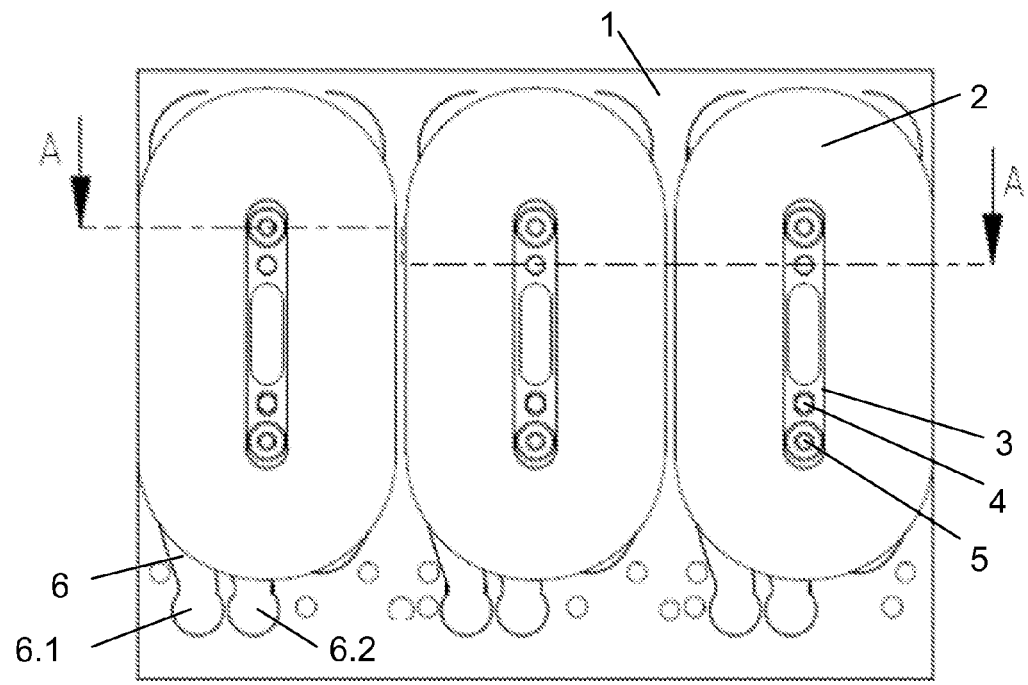
FIG. 2 is a front view of the primary part.

FIG. 2 is a front view of the primary part. The area of the cooling plate which includes inlet 6.1 and outlet 6.2 has been left free of coils 2. This area projecting out of the area of coils 2 is connected to a supply strip, via which a cooling medium is delivered and in which the electrical connections of coils 2 are contained, as well.

The front view of FIG. 2 also illustrates that, as far as their form is concerned, holding pieces 3 correspond to openings 2.1 in coils 2.

Figure 3:
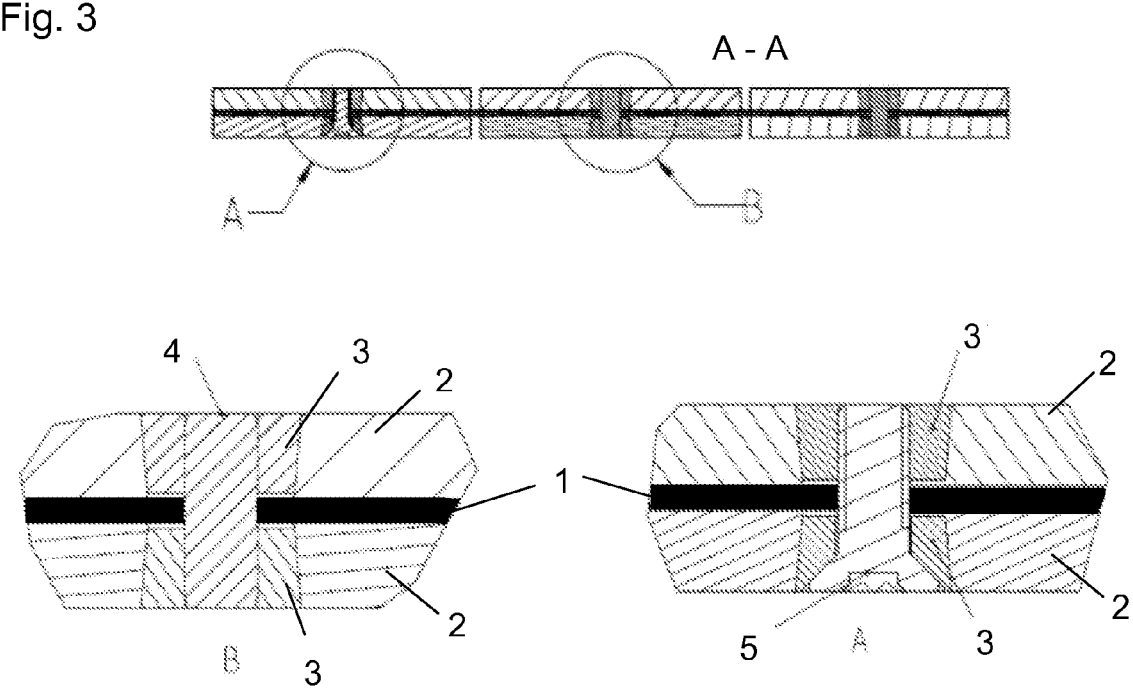
FIG. 3 is a top view cross-sectional view through the primary part.

In addition, FIG. 3 is a cross-sectional view taken along line A indicated in FIG. 2. The cross-sectional view is taken at different levels of cooling plate 1, so that both a screw 5 and a centering pin 4 are shown in cross-section. The two enlarged areas A and B of FIG. 3 are also illustrated.

The two enlarged areas A and B of FIG. 3 illustrate the slightly conical form of holding pieces 3 which taper toward cooling plate 1 and by which coils 2 are fixed in position on cooling plate 1.

Cooling plate 1, holding pieces 3, and therefore also coils 2 are aligned relative to each other by centering pins 4. Therefore, the coils may quite simply be positioned very uniformly and precisely, so that the electromotive counter-force—in a linear motor having three phases—has an electrical phase displacement of 120 degrees.

Two facing holding pieces 3 are pulled toward each other by screws 5, so that holding pieces 3 are pressed against cooling plate 1. In so doing, coils 2 are also pressed against cooling plate 1 because of the conical shape of holding pieces 3.

In order to press coils 2 against cooling plate 1, not only in their inner area close to opening 2.1 and therefore in the area of engagement of holding piece 3, additional clamps may be provided in the outer area of coils 2 which press the outer area against cooling plate 1, as well.

However, during manufacture, coils 2 may be wound so as to be slightly conical or with a slight camber, so that a cup spring is obtained. During assembly, coil 2 initially rests on cooling plate 1 only with its outermost turns, while in the inner area in the vicinity of opening 2.1, it is somewhat at a distance from cooling plate 1. Only upon mounting a holding piece 3 does it press coil 2 completely against cooling plate 1. The effect of the spring forces occurring due to the deformation of coil 2 formed as a cup spring are that coil 2 is also pressed in the outer area against cooling plate 1, so that good thermal contact between coil 2 and cooling plate 1 is provided over the entire surface. In addition, in this manner, air pockets may reliably be avoided when encapsulating the primary part with synthetic resin. Such air pockets would impede the transfer of heat considerably.

Cooling plate 1 may also be fitted with coils 2 only on one side. To that end, screws 5 may be screwed directly to cooling plate 1 or to nuts mounted on the side opposite coils 2. It is then also possible to dispense with an active cooling and, for example, to provide the side of cooling plate 1 opposite coils 2 with suitable cooling fins in order to achieve good heat transfer to the surroundings.

Whether cooling plate 1 is fitted with coils 2 on one side or on both sides, it may be sufficient to actively cool the area of cooling plate 1 projecting from the area of coils 2.

The primary part is made complete by a secondary section to form a linear motor. This secondary section has a series of magnets which are magnetized in alternating parallel and anti-parallel fashion relative to the coil axes, and whose magnetic fields interact with the currents flowing in coils 2 of the primary part and in so doing, bring about a force which drives the linear motor. In this context, the series of magnets may be disposed only on one side of the cooling plate (as is the case, for instance, for the planar motor described in U.S. Pat. No. 6,313,550, mentioned above) or on both sides of the cooling plate, the respective opposite magnetic poles then opposing each other (as shown, for example, in FIG. 15 of U.S. Pat. No. 6,639,333, mentioned above). Such a double magnet track as a secondary section increases the power of the linear motor just like the placement of coils 2 on both sides of cooling plate 1.

What is claimed is:

1. A primary part for an ironless linear motor, comprising:
    a cooling plate;
    flat coils arranged on the cooling plate, each coil having a central opening; and
    holding pieces having tapered exterior surfaces, the tapered exterior surfaces tapering toward the cooling plate, the tapered exterior surfaces of the holding pieces engaging in the openings in the coils, the holding pieces pressing the coils onto the cooling plate by the engagement of the tapered exterior surfaces of the holding pieces and the openings in the coils, wherein the tapered exterior surfaces of the holding pieces are in direct contact with interior surfaces of the openings in the coils and secure the coils on the cooling plate with form locking in all directions.

2. The primary part according to claim 1, wherein the cooling plate and the holding pieces have corresponding bores, the primary part including centering pins inserted through the bores.

3. The primary part according to claim 1, further comprising screws that press the holding pieces against the cooling plate.

4. The primary part according to claim 1, wherein coils are arranged on both sides of the cooling plate opposite to each other in pairs.

5. The primary part according to claim 4, wherein the cooling plate and the holding pieces have corresponding bores, the primary part including centering pins inserted through the bores, and wherein two holding pieces of each pair of mutually facing coils are arranged opposite to each other on both sides of the cooling plate and are aligned relative to each other by at least one of the centering pins.

6. The primary part according to claim 5, wherein the two mutually opposing holding pieces are screwed to each other by at least one screw to press the mutually facing coils against the cooling plate by the holding pieces.

7. The primary part according to claim 1, wherein the flat coils are wound as cup springs, so that a pressure force exerted by the holding piece in an inner area of the coils is transferred by a spring action to an outer area of the coils, and the coils are pressed over an entire surface against the cooling plate.

8. The primary part according to claim 1, wherein the tapered exterior surfaces of the holding pieces and the openings of the coils have complementary geometries.

9. The primary part according to claim 1, wherein the holding pieces secure the coils on the cooling plate with form locking between the tapered exterior surfaces of the holding pieces and the openings of the coils.

10. A linear motor, comprising:
a primary part including:
a cooling plate;
flat coils arranged on the cooling plate, each coil having a central opening; and
holding pieces having tapered exterior surfaces, the tapered exterior surfaces tapering toward the cooling plate, the tapered exterior surfaces of the holding pieces engaging in the openings in the coils, the holding pieces pressing the coils onto the cooling plate by the engagement of the tapered exterior surfaces of the holding pieces and the openings in the coils, wherein the tapered exterior surfaces of the holding pieces are in direct contact with interior surfaces of the openings in the coils and secure the coils on the cooling plate with form locking in all directions.

11. The linear motor according to claim 10, wherein the tapered exterior surfaces of the holding pieces and the openings of the coils have complementary geometries.

12. The primary part according to claim 10, wherein the holding pieces secure the coils on the cooling plate with form locking between the tapered exterior surfaces of the holding pieces and the openings of the coils.

* * * * *